(12) United States Patent
Kühlein et al.

(10) Patent No.: US 8,679,601 B2
(45) Date of Patent: Mar. 25, 2014

(54) METHOD OF PRODUCING A MEDICAL FLUID CONTAINER FROM FLEXIBLE PLASTIC MATERIAL, FILM TUBING AS INTERMEDIATE PRODUCT FOR A FLUID CONTAINER OF THIS TYPE AND MEDICAL CONTAINER PRODUCED ACCORDING TO A METHOD OF THIS TYPE

(75) Inventors: Georg Kühlein, Röslau (DE); Martin Schenkel, Schnelldorf (DE)

(73) Assignee: Raumedic AG, Muenchberg (DE)

( * ) Notice: Subject to any disclaimer, the term of this patent is extended or adjusted under 35 U.S.C. 154(b) by 1124 days.

(21) Appl. No.: 12/519,086

(22) PCT Filed: Dec. 8, 2007

(86) PCT No.: PCT/EP2007/010701
§ 371 (c)(1),
(2), (4) Date: Jun. 12, 2009

(87) PCT Pub. No.: WO2008/071358
PCT Pub. Date: Jun. 19, 2008

(65) Prior Publication Data
US 2010/0042066 A1      Feb. 18, 2010

(30) Foreign Application Priority Data
Dec. 12, 2006   (DE) .......................... 10 2006 058 498

(51) Int. Cl.
*B29C 47/00* (2006.01)
(52) U.S. Cl.
USPC ... 428/35.2; 428/35.7; 428/36.92; 428/542.6; 604/6.15; 604/408; 264/209.3
(58) Field of Classification Search
USPC ............ 428/35.7, 34.3, 35.2, 35, 36.9, 36.92, 428/542.6, 542.87; 604/408, 403; 264/209.3
See application file for complete search history.

(56) References Cited

U.S. PATENT DOCUMENTS 3,367,997 A * 2/1968 Smith .......................... 523/400
2002/0002238 A1    1/2002 Laplante et al.

FOREIGN PATENT DOCUMENTS

| DE | 2520229 A1 | 11/1976 |
| DE | 3431201 A1 | 3/1986 |
| EP | 0104433 A | 4/1984 |
| EP | 0167015 A2 | 1/1986 |
| EP | 0366554 A | 5/1990 |
| EP | 1393759 A1 | 3/2004 |
| WO | 9314735 A1 | 8/1993 |

* cited by examiner

*Primary Examiner* — Ellen S Raudenbush
*Assistant Examiner* — Yan Lan
(74) *Attorney, Agent, or Firm* — Browdy and Neimark, PLLC

(57) ABSTRACT

A medical fluid container of a flexible plastic material is produced as follows: at first, a plastic compound is produced from a heterogeneous mixture of a first, lower-viscosity raw polymer component having a first melt viscosity and a second, higher-viscosity raw polymer component having a second melt viscosity which is greater than the first melt viscosity. Then the plastic compound is extruded. The extrudate is confectioned. Finally, the confectioned extrudate is sealed to form the finished fluid container. A film tubing may serve as intermediate product for the medical container. The medical container or the film tubing thus produced has surface structures with a typical average size of 15 to 200 μm. The production method requires little effort while fulfilling demanding requirements with respect to the stability of the produced fluid container.

16 Claims, 2 Drawing Sheets

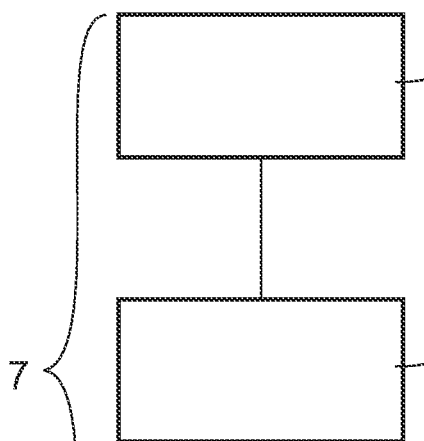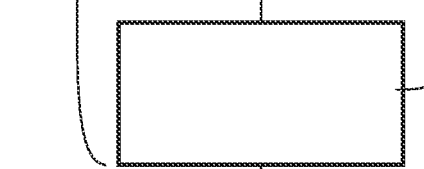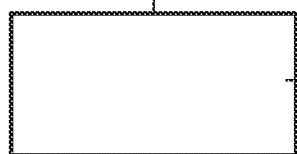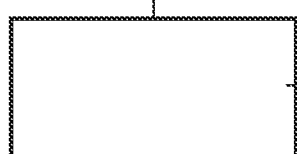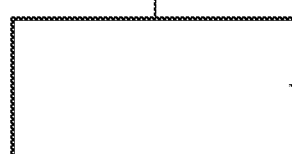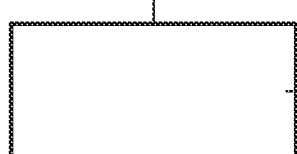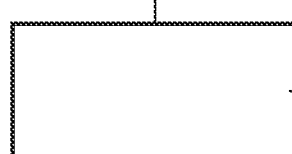
Fig. 2  Fig. 3

METHOD OF PRODUCING A MEDICAL FLUID CONTAINER FROM FLEXIBLE PLASTIC MATERIAL, FILM TUBING AS INTERMEDIATE PRODUCT FOR A FLUID CONTAINER OF THIS TYPE AND MEDICAL CONTAINER PRODUCED ACCORDING TO A METHOD OF THIS TYPE

BACKGROUND OF THE INVENTION

1. Field of the Invention

The invention relates to a method of producing a medical fluid container from flexible plastic material. The invention further relates to a film tubing as intermediate product for a medical container thus produced, and to a medical container produced according to a method of this type.

2. Background Art

It is known through prior public use to produce a medical fluid container, namely a blood bag, from flexible plastic or synthetic material. In the production process, the blood bag is produced from two calendared layers of film which are placed on top of each other and welded together at the edges. Calendaring is required for structuring the surfaces of the film layers facing the inside of the container so as to prevent the film layers from sticking together in an undesirable manner which would make it difficult or even impossible for the fluid container to be filled. Calendaring of the film layers requires a considerable amount of effort. Moreover, unwanted foreign particles may become trapped between the film layers placed on top of each other, and thus contaminate the produced medical fluid containers. The relative positioning of the film layers placed on top of each other requires a considerable amount of effort as well.

EP 0 167 015 A2 discloses the production of a medical blood bag in the shape of a two-layer blow-molded part.

EP 0 104 433 A1 describes the production of a hollow body.

DE 34 312 01 A1 discloses the production of films and other two-dimensional structures.

WO 93/14735 A1 describes a two-layer medical fluid container.

SUMMARY OF THE INVENTION

It is therefore an object of the present invention to improve a method of producing a medical fluid container in such a way that the method requires less effort while at the same time fulfilling demanding requirements with respect to the absence of particles on the produced medical fluid container.

This object is achieved according to the invention by a method of producing a medical fluid container from a flexible plastic material, the method comprising the following steps:
  producing a plastic compound from a heterogeneous mixture of a first, lower-viscosity raw polymer component having a first melt viscosity and a second, higher-viscosity raw polymer component having a second melt viscosity which is greater than the first melt viscosity;
  forming a single-layer extrudate by extruding the plastic compound;
  confectioning the extrudate;
  sealing the confectioned extrudate to form the finished fluid container,
wherein the plastic compound is produced using a lower-viscosity raw polymer component having a first melt viscosity with a K-value between 50 and 70, and a higher-viscosity raw polymer component having a second melt viscosity with a K-value between 60 and 100.

It has been found according to the invention that a plastic or synthetic compound, which is mixed in a defined heterogeneous manner, may provide extrusion conditions which result in an extrudate having a structured surface. A subsequent calendaring of the extrudate is then no longer necessary. This facilitates the production of the medical fluid container. A fluid container produced in this manner is easily fillable even without calendaring as the surface structures produced during extrusion prevent the film layers defining the inside of the fluid container from sticking together. According to the invention, a single-layer extrudate is produced during extrusion. Walls of the fluid container produced in this manner are thus formed of a single-layer extrudate and not of a multilayer extrudate, as is the case for fluid containers known from prior art. This facilitates the production of the fluid container as a co-extrusion step can be dispensed with.

The produced plastic compound has a lower-viscosity raw polymer component having a first melt viscosity with a K-value between 50 and 70 and a higher-viscosity raw polymer component having a second melt viscosity with a K-value between 60 and 100. Plastic compounds of this type have a sufficiently different extrusion behavior, which ensures that a heterogeneous mixture of these two plastic compounds results in the desired surface structures of the extrudate. In this process, a larger quantity of the low-viscosity portion is usually provided at first to which is then added a comparatively smaller quantity of the higher-viscosity portion.

The same applies to a plastic compound which is produced using a raw polymer component which is added in the form of a suspension polymer as the melt viscosity, and therefore the extrusion behavior, of suspension polymers sufficiently differs from that of other polymers.

Raw PVC polymer components used for producing the plastic compound proved to be suitable for the production of medical fluid containers, in particular for the production of blood bags.

Series of tests performed by the applicant have shown that extrudates with a desired surface structure are obtained using mixing ratios of 10:1 to 3:1 for adding the raw polymer components during the production of the plastic compound. The mixing ratios usually contain a greater quantity of the lower-viscosity raw polymer component. A mixing ratio of for instance 10:1 therefore usually means that the mixture contains 10 parts of the lower-viscosity raw polymer component and 1 part of the higher-viscosity raw polymer component.

If the plastic compound is produced from two different raw polymer components and a softener, advantage may be taken of the effect that the softener attaches to the two raw polymer components in different ways, which again results in different extrusion behaviors of the two raw polymer components. The different raw polymer components may be polymer components with different polymer chain lengths or a suspension polymer component and another polymer component.

In a heterogeneous mixture which is produced by adding the softener just before the extrusion, which is produced by adding the softener just before the extrusion, different extrusion parameters of particular components of the produced plastic compound are due to the short mixing time which prevents a homogeneous mixing of the at least one raw polymer component and the softener.

The softeners DEHP, TEHTM, DINCH and ESO, with at least one of which being added to the plastic compound, proved to be suitable for the production of extrudates having surface structures.

A plastic tubing or film tubing produced during extrusion allows the medical fluid container to be produced in such a way that no plastic layers are placed on top of each other; instead, the fluid container is produced directly from the film tubing. A contamination of the inside of the container is thus impossible as the two layers enclosing the inside of the container are not separated from each other during the production of the container.

The advantages of a film tubing which serves as intermediate product for a medical container and is produced according to a method according to the invention, with the method steps confectioning and sealing being omitted in the production of the film hose, correspond to those which have been mentioned above with reference to the method according to the invention.

The same applies to a medical container which is produced according to a method according to the invention.

The advantages of the medical container produced according to the invention become particularly apparent in a medical container in the form of a blood bag because of the particularly demanding requirements placed on the blood bag as far as the absence of particles and the filling ability thereof are concerned.

Surface structures with a layer thickness variation of 15 to 200 µm allow the medical fluid container to be filled easily but require only little effort when it comes to the sealing step for hermetic sealing of the fluid container. Sealing may for instance take place using a hot-sealing or welding method known to those skilled in the art.

Embodiments of the invention will hereinafter be explained in more detail by means of the drawing.

BRIEF DESCRIPTION OF THE DRAWING

Embodiments of the invention will hereinafter be explained in more detail by means of the drawing in which

FIG. 2 is a sequence diagram of a method of producing the fluid container according to FIG. 1; and FIG. 3 is a sequence diagram of another method of producing the fluid container according to FIG. 1.

DESCRIPTION OF THE PREFERRED EMBODIMENTS

Figure 1:
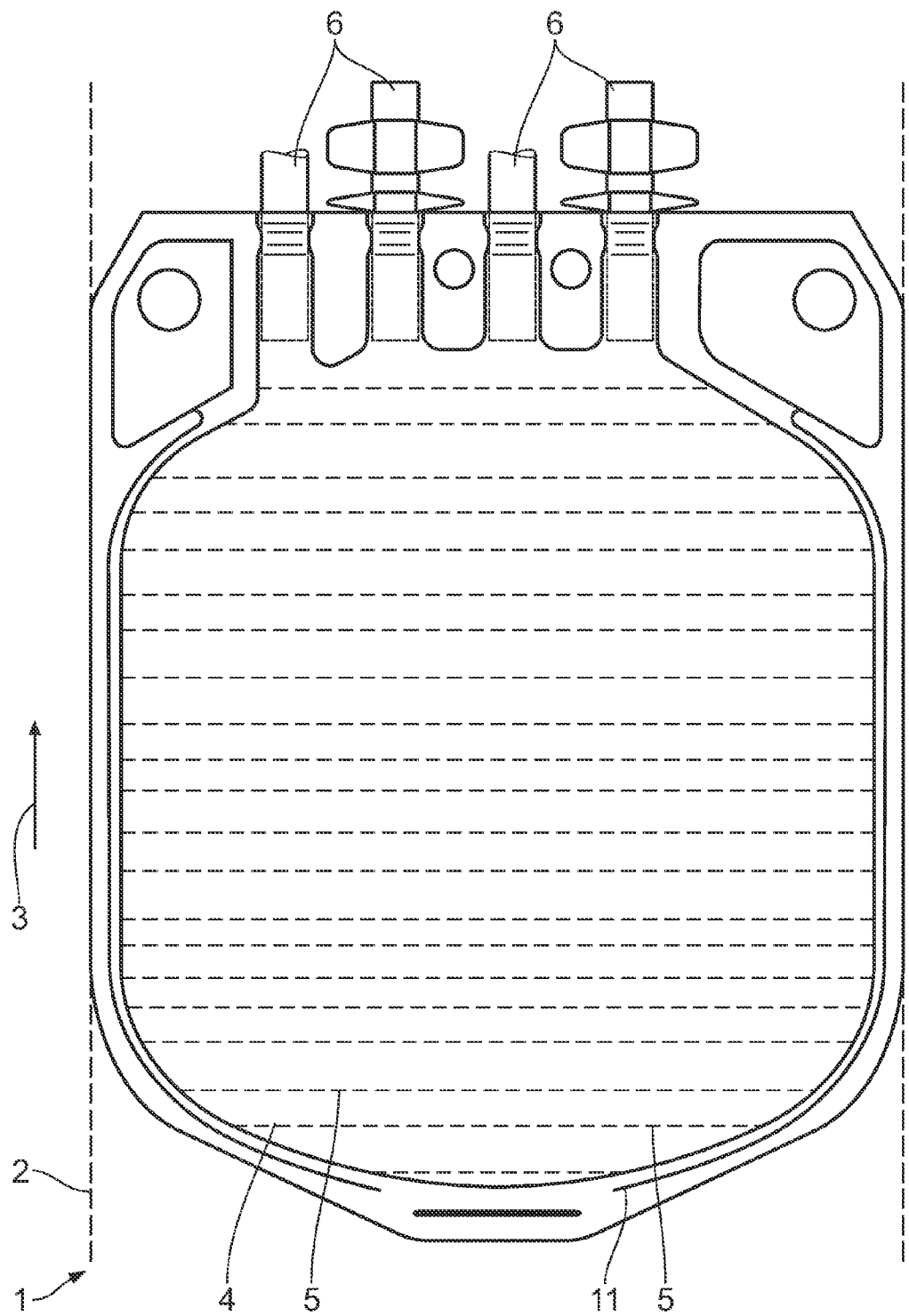
FIG. 1 is a plan view of a medical fluid container consisting of flexible plastic material.

FIG. 1 shows a blood bag 1 as an example of a medical fluid container. The blood bag 1 is made of a flexible plastic material, namely PVC in the present case. A film tubing 2 serves as intermediate product during the production of the blood bag 1, with the longitudinal extension thereof along a direction 3 being indicated by dashed lines in FIG. 1.

Container walls 4 of the blood bag 1 have surface structures 5 extending perpendicular to the longitudinal extension 3. In the illustration according to FIG. 1, these surface structures 5 are represented as a dense sequence of lines extending perpendicular to the longitudinal extension 3. The layer thickness of the container walls 4 is approximately constant along such a line which is perpendicular to the longitudinal extension 3. In the direction of the longitudinal extension 3, in other words perpendicular to the lines, the layer thickness of the container walls 4 varies in such a way that in these regions, the surface structures 5 are not only measurable but also sensible. The surface structures 5 and therefore the layer thickness variation of the container walls 4 have a typical average size of 15 µm to 200 µm. The container walls 4 are therefore rough towards the inside of the blood bag and also towards the outside.

The surface structures 5 can be characterized by their measured roughness depths and by their average roughness value. The measurements can be differentiated by whether the corresponding roughness parameter is measured along the surface structures 5 or perpendicular thereto. A typical sequence of measurements of the roughness depth (in µm) along the surface structures 5 is 20, 23, 24, 30. A typical sequence of measurements of the roughness depth (in µm) perpendicular to the surface structures 5 is 29, 36, 47. In this case, there is a layer thickness variation which is roughly between 15 and 55 µm.

A typical sequence of measurements of the average roughness value (in µm) along the surface structures 5 is 3, 4, 5. A typical sequence of measurements of the average roughness value (in µm) perpendicular to the surface structures 5 is 6, 6, 8. Typical values of the average roughness value are thus between 2 and 10 µM.

The blood bag 1 comprises a total of four connection ports 6 which are designed in a manner known per se.

A first production method for the blood bag 1 will now be explained by means of FIG. 2. At first, a plastic compound consisting of a heterogeneous mixture of a first, lower-viscosity raw polymer component having a first melt viscosity and a second, higher-viscosity raw polymer component having a second melt viscosity is produced in a production step 7, with the second melt viscosity being greater than the first melt viscosity. In the example of the blood bag 1, the two raw polymer components are two raw PVC components, namely a suspension PVC component and another PVC component. The two raw polymer components may also be components of the same polymer with different chain lengths.

The lower-viscosity raw polymer component has a melt viscosity with a K-value between 50 and 70. The higher-viscosity raw polymer component has a melt viscosity with a K-value between 60 and 100. The two raw polymer components are added in the production step 7 with a mixing ratio of 10:1 to 3:1. The ratios when mixing the two raw polymer components are selected such that a defined, non-homogeneous mixing of the raw polymer components takes place, with the result that a heterogeneous mixture is obtained when the production step 7 is finished. This heterogeneous mixture contains regions which consist almost exclusively of the first raw polymer component, and regions which consist almost exclusively of the second raw polymer component.

After the second production step 7, the plastic compound is extruded in an extrusion step 8. When the mixture is extruded, the surface structures 5 are produced as a result of the different melt viscosities of the two raw polymer components and the heterogeneity of the produced mixture since the components of the mixture consisting almost exclusively of lower-viscosity raw polymer produce a different layer thickness of the film tubing 2 than the components consisting almost exclusively of higher-viscosity raw polymer. The film tubing 2 is extruded in the extrusion step 8. The extruded film tubing 2 is confectioned in subsequent a confectioning step 9. In this step, the film tubing 2 is divided into portions which correspond to the length of the blood bags 1 to be produced, and is cut to the desired shape if necessary.

Finally, the confectioned film tubing 2 is sealed in a final sealing step 10 so as to form the finished blood bag 1. This is performed by welding the film tubing together along a welding line 11 at the periphery thereof.

The following is a description of an alternative method of producing the blood bag 1 by means of FIG. 3. Method steps which correspond to those that have already been explained above with reference to FIG. 2 have the same reference numerals and are not discussed in detail again. In the method according to FIG. 3, the production step 7 is divided into three individual steps. At first, a plastic compound is produced from two different raw polymer components in a raw production step 12. In this step, a heterogeneous mixture is produced from the two raw polymer components. Subsequently, a softener is added in an addition step 13. The softener is one of the following softeners: DEHP (Di(2-ethylhexyl)phthalate), TEHTM (Tri(2-ethylhexyl)trimellitate, DINCH (Di-isononyl-cyclohexane-1,2-dicarboxylate), ESO (epoxidized soybean oil). A mixture of these softeners can be added as well. The softener is added just before the end of the production step 7 so that a mixing step 14 of the production step 7, during which the softener is mixed with the raw polymer components, is short.

This results in a heterogeneous mixing of the softener and the raw polymer components.

Afterwards, the film tubing 2 is extruded from the plastic compound thus produced. In the method according to FIG. 3, the different layer thicknesses of the film tubing 2, in other words the surface structures 5, are produced as a result of several overlapping effects. On the one hand, a layer thickness variation may be the result of different melt viscosities of the raw polymer components, as described above with reference to the method according to FIG. 2. Furthermore, the raw polymer components may have different behaviors when bonding to the softener. For instance, the first raw polymer component may bond well to the softener even after a short mixing time, whereas the second polymer component has not bonded to the softener at all or only partially when the mixing step 14 is finished. This increases the differences in the extrusion behavior of the two raw polymer components. Finally, the effect that due to the short mixing time, it was impossible for the softener to come into contact with the two raw polymer components in all regions provides for an even more increased heterogeneity of the produced plastic compound in terms of its extrusion behavior. All these overlapping effects are favorable for the formation of the surface structures 5. The production step 7 is followed by the extrusion step 8, the confectioning step 9 and the sealing step 10, as described above with reference to the method according to FIG. 2.

In a modification of the method according to FIG. 3, the plastic compound may also be produced from only one raw polymer component, with a softener being added in a heterogeneous mixture. In this modification, the two components of the plastic compound, which have a different extrusion behavior and therefore form the surface structures 5, are on the one hand formed by the component of the plastic compound which has bonded to the softener, and on the other by the raw polymer component which has not bonded to the softener. Depending on the softener that is used and the K-values of the raw polymer components, the produced surface structures 5 differ in terms of the measured layer thickness variations, the measured roughness depths and the measured average roughness values.

The following is a description of an embodiment where the flexible plastic material is mixed together from two PVC components having different K-values and a softener. The softener is DEHP. The two raw polymer components are PVC with a K-value of 70 and structuring PVC having a K-value of 80. These components are mixed at a mixing temperature of 160° C. After a mixing time of 18 minutes, the PVC component with the K-value 80 is added to the other components that had been mixed before, i.e. the softener and the PVC component with the K-value 70.

The invention claimed is:

1. A film tubing (2) as intermediate product for a medical container (1), the film tubing (2) comprising
a lower-viscosity raw polymer component having a first melt viscosity with a K-value between 50 and 70, and a second raw polymer component having a second melt viscosity higher than the first melt viscosity with the second melt viscosity having a K-value between 60 and 100,
wherein said film tubing (2) is produced from a flexible plastic material, and the film tubing (2) is produced according to a method comprising the following steps:
producing (7) a plastic compound from a heterogeneous mixture of the first, lower-viscosity raw polymer component and the second, higher-viscosity raw polymer component;
forming a single-layer extrudate having a structured surface by extruding (8) the plastic compound;
wherein the extruded film tubing has a single layer having a structured surface having regions consisting of the lower-viscosity raw polymer component and regions consisting of second raw polymer component, wherein the structured surface has a cross-sectional thickness variation along a length thereof.

2. The film tubing of claim 1 having a layer thickness variation between 15 and 55 μm.

3. The film tubing according to claim 1 having an average surface roughness value between 2 and 10 μm.

4. The film tubing of claim 1 having an average surface roughness from 3 μm to 5 μm.

5. The film tubing of claim 1 having an average surface roughness from 6 μm to 8 μm.

6. The film tubing of claim 1, the polymer having a first melt viscosity and the polymer having a second melt viscosity are both PVC.

7. The film tubing of claim 1 wherein the polymers are present at a mixing ratio of the lower-viscosity raw polymer component to the higher-viscosity raw polymer component of 10:1 to 3:1.

8. The film tubing of claim 1 further comprising a softener.

9. The film tubing of claim 8 wherein the softener comprises at least one member selected from the group consisting of:
DEHP;
TEHTM;
DINCH;
ESO.

10. A method of producing a film tubing, for a medical fluid container (1), from a flexible plastic material, the method comprising the following steps:
producing (7) a plastic composition from a heterogeneous mixture of a first, lower-viscosity raw polymer component having a first melt viscosity and a second, higher-viscosity raw polymer component having a second melt viscosity which is greater than the first melt viscosity;
wherein the first, lower-viscosity raw polymer component has a K-value between 50 and 70, and the second higher-viscosity raw polymer component has a second melt viscosity having a K-value between 60-100;
forming a single-layer extrudate having a structured surface by extruding (8) the plastic composition, wherein the structured surface having regions consisting of the first raw polymer component and regions consisting of the second raw polymer component and the structured surface with a cross-sectional thickness variation along a length thereof; and confectioning (9) the extrudate, comprising at least one of cutting the extrudate to length and trimming.

11. A method according to claim 10, wherein the plastic composition is produced using a raw polymer component which is added in the form of a suspension polymer.

12. A method according to claim 10, wherein the plastic composition is produced from two raw PVC polymer components.

13. A method according to claim 10, wherein the raw polymer components are added at a mixing ratio of 10:1 to 3:1 during the production (7) of the plastic composition.

14. A method according to claim 10, wherein the plastic composition is produced from two different raw polymer components and a softener.

15. A method according to claim 14, wherein the heterogeneous mixture is produced by adding (13) the softener just before the extrusion (8).

16. A method according to claim 14, wherein at least one softener of the following group is added as softener:
DEHP;
TEHTM;
DINCH;
ESO.

* * * * *